US007242956B2

United States Patent
Ratasuk et al.

(10) Patent No.: US 7,242,956 B2
(45) Date of Patent: Jul. 10, 2007

(54) RAPID CHANNEL QUALITY BASED POWER CONTROL FOR HIGH SPEED CHANNELS

(75) Inventors: Rapeepat Ratasuk, Hoffman Estates, IL (US); Amitava Ghosh, Buffalo Grove, IL (US); Fan Wang, Vernon Hills, IL (US); Weimin Xiao, Barrington, IL (US); Nick W. Whinnett, Barnfield Marlborough (GB)

(73) Assignee: Motorola, Inc., Schaumburg, IL (US)

( * ) Notice: Subject to any disclaimer, the term of this patent is extended or adjusted under 35 U.S.C. 154(b) by 119 days.

(21) Appl. No.: 11/017,481

(22) Filed: Dec. 20, 2004

(65) Prior Publication Data

US 2006/0135193 A1    Jun. 22, 2006

(51) Int. Cl.
*H04B 7/00*    (2006.01)

(52) U.S. Cl. .................... 455/522; 455/452.2

(58) Field of Classification Search ............... 455/69, 455/522, 431.1, 418, 439, 441–443, 506, 455/116, 127.1, 452.2; 375/297, 298; 370/319, 370/320

See application file for complete search history.

(56) References Cited

U.S. PATENT DOCUMENTS 6,137,840 A * 10/2000 Tiedemann et al. ......... 375/297

| 2003/0010922 | A1 | 1/2003 | You et al. |
| 2004/0142698 | A1* | 7/2004 | Pietraski .................. 455/452.2 |
| 2006/0089104 | A1* | 4/2006 | Kaikkonen et al. ...... 455/67.13 |

OTHER PUBLICATIONS

3GPP TSG-Ran WG1 Futher simulation results on HS-SCCH power control and HSDPA system throughoput performace Aug. 22, 2002.
TSG-Ran working group, Considerations on HS-SCCH Power Control, Paris France, Apr. 12, 2002.

* cited by examiner

*Primary Examiner*—Edward F. Urban
*Assistant Examiner*—Tu X. Nguyen

(57) ABSTRACT

A method (400) and apparatus (501) provide for rapid power control based on a quality related value, e.g. channel quality indicator (CQI) value. A transmit power level can be derived from a CQI value received according to a time period, e.g. corresponding to 500 Hz. A first predicted value can be predicted based on the CQI value, at a first time within the time period and a power adjustment value can be determined based on the CQI value as well as the first predicted value at a rate that exceeds the rate of receiving the CQI values. Note that other predicted values for or corresponding to the CQI value can be predicted at other times within the time period and that power adjustment values can be determined through interpolation between predicted values for any time within the period.

15 Claims, 5 Drawing Sheets

RAPID CHANNEL QUALITY BASED POWER CONTROL FOR HIGH SPEED CHANNELS

FIELD OF THE INVENTION

The present invention relates in general to wireless communication systems, and more specifically to a method and apparatus for performing rapid power control using quality parameters.

BACKGROUND OF THE INVENTION

In conventional wireless communication systems such as High Speed Downlink Packet Access (HSDPA) systems, the High Speed Shared Control Channel (HS-SCCH) carries downlink signaling information required for demodulating the High Speed Downlink Shared Channel (HS-DSCH). Since power control for the HS-SCCH is defined generally in 3GPP specifications as being under control of the serving Node B transceiver, the operator of the Node B transceiver is free to implement any power control algorithm. Traditional R99 power control and related methods allow for a relatively simple power control technique which couples the HS-SCCH transmit power with a downlink Dedicated Physical Control Channel DPCCH through the use of an offset factor. Since the control channel is always on, the Node B transceiver simply applies the offset factor to the present DPCCH power to arrive at the transmission power of the HS-SCCH when there is packet data to be transmitted on the HS-DSCH.

Although the use of an offset factor, as described, is relatively easy to implement, performance of the HS-SCCH can degrade severely when the UE is in a soft-handover (SHO) state because HSDPA-related channels are not in soft-handover. Due to diversity combining gains, the dedicated channels require much less power when engaged in SHO. However, the HS-SCCH still has identical power requirements as in the non-SHO case, leading to poor performance when R99 power control algorithm is used, especially when the SHO occurs at low UE speeds. For example, when the UE is in 2-way SHO, approximately 5 dB more power may be required on the HS-SCCH to reach 1% FER due to degradation from the R99 power control algorithm.

In some instances, power control can be improved by basing downlink power control on uplink oriented information such as the Channel Quality Indicator (CQI) report. Drawbacks exist for CQI based power control in that the CQI report, for example, in HSDPA systems is issued at a frequency not greater than 500 Hz. As a result conventional CQI based power control is rendered ineffective for UE speeds of around 30 km/h or greater or for other scenarios where the frequency of the CQI report is relatively low or slow.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

Figure 1:
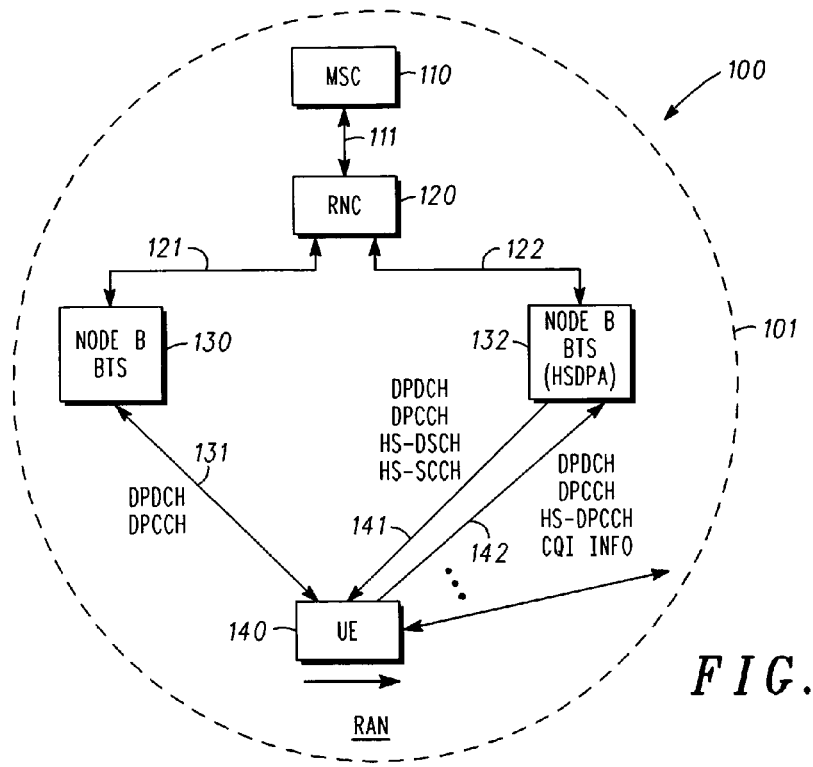
FIG. 1 is a diagram illustrating an exemplary Radio Access Network (RAN) such as a HSDPA RAN serving a UE in Soft Handover (SHO)

In overview, the present invention relates to wireless communication in a Radio Access Network and equipment for providing communication such as infrastructure equipment, transceivers (Node B, Base Transmitter Stations, and the like), User Equipment (UE), and the like. More particularly, various inventive concepts and principles are embodied in cellular communication systems, infrastructure components, communication devices, and methods therein for performing rapid power control and for performing rapid power control during soft handoffs or handovers (SHOs). It should be noted that in addition to connoting a typical handset, the term User Equipment (UE) may be used interchangeably with communication unit, mobile station, subscriber unit, wireless subscriber unit, wireless subscriber device or the like. Each of these terms denotes a device ordinarily associated with a user and typically a wireless mobile device that may be used with a public network or within a private network such as an enterprise network. Examples of such units include personal digital assistants, personal assignment pads, and other portable personal computers equipped for wireless operation, a cellular handset or device, or equivalents thereof.

The present description is provided to further explain, in an enabling fashion, exemplary modes of performing one or more embodiments of the present invention. The description is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

In addition to devices of a general nature, the infrastructure devices of particular interest are those providing or facilitating voice/data communications services over cellular wide area networks (WANs), such as conventional two way systems and devices, various cellular phone systems including for example, CDMA (code division multiple access) and variants thereof, GSM (Global System for Mobile), GPRS (General Packet Radio System), 2.5G and 3G systems such as UMTS (Universal Mobile Telecommunication Service) systems, Internet Protocol (IP) Wireless Wide Area Networks like 802.16, 802.20 or Flarion, integrated digital enhanced networks and variants or evolutions thereof. Furthermore the wireless communication units or devices of interest can have short range wireless communications capability normally referred to as WLAN capabilities, such as IEEE 802.11, Bluetooth, or Hiper-Lan and the like preferably using CDMA, frequency hopping, OFDM (Orthogonal Frequency Division Multiplexed) or TDMA (Time Division Multiple Access) technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), or other protocol structures.

As further discussed herein below, various inventive principles and combinations thereof are advantageously employed to provide rapid power control within a Radio Access Network for transmission power in a link between, for example, a Node B transceiver and a User Equipment (UE).

In a conventional RAN, such as a RAN 101, as can be seen in the diagram 100 of FIG. 1, an exemplary configuration including a Mobile Switching Center (MSC) 110, a Radio Network Controller (RNC) 120 (note in some systems the RNC may be analogous to or referred to as a base site controller (BSC)), a first transmitter 130 (may alternatively be referred to as a Node B or Base Transmitter Station (BTS) depending on particular system standards and herein as Node B BTS) and a second Node B BTS 132 having for example HSDPA capabilities, is shown serving a UE 140. Note that for the sake of simplicity, the MSC is referred to as part of the RAN although this functionality may be distinguished from the RAN by some practitioners in many situations. In the RAN 101, an exemplary SHO is shown where UE 140 is handing over to the second Node B BTS 132 after having established a Dedicated Physical Data Channel (DPDCH) and a Dedicated Physical Control Channel (DPCCH) on link 131 with the first Node B BTS 130. As noted above, power control in conventional RANs such as the RAN 100 can be conducted by adding an offset factor, relative to the downlink DPCCH transmit power, to the HS SCCH on, for example, downlink 141. In some systems, CQI info which is sent to the Node B BTS 132 on uplink 142 at no more than 500 Hz for HSDPA systems, can be used to form a power control factor, adjustment factor or the like for the HS SCCH. However, due to the relative infrequency of the CQI Report, particularly relative to various timing considerations associated with a SHO such as a SHO occurring just before or just after a CQI report, the adjustment will be less useful and can be associated with a performance degradation based on factors such as the 5 dB power increase requirement for 2 way SHO (uplink and downlink SHO) for the high speed channels relative to the dedicated channels. Various performance comparisons are shown, for example, in FIG. 6-FIG. 8.

In HSDPA systems, the HS-SCCH carries downlink signaling information required for demodulating the HS-DSCH. As previously noted, power control of the HS-SCCH is loosely defined in 3GPP specifications as being under control of the Node B BTS 132. Therefore, the operator of the Node B BTS 132 may implement any power control algorithm. Traditional R99 power control methods allow for simple power control of the HS-SCCH by, for example, coupling the transmit power of the HS-SCCH with the power associated with the downlink DPCCH through the use of an offset factor. Since the control channel is always on, the Node B BTS 132 an apply an offset to the present DPCCH power level to arrive at the transmission power of the HS-SCCH when there is packet data to be transmitted on the HS-DSCH. Although an offset scheme as described is easy to implement, performance of the HS-SCCH can degrade severely when the UE is in SHO because some of the HSDPA-related channels may not be in SHO. Due to diversity combining gains, the dedicated channels require much less power when in SHO. However, the HS-SCCH still has identical power requirements as in the non-SHO case, leading to poor performance when R99 power control algorithm is used, especially when the exemplary UE 140 is moving at low speeds. As can be seen for example in the graph shown in FIG. 6, when the UE 140 is in 2-way SHO, approximately 5 dB more power is required on the HS-SCCH to reach 1% FER due to degradation from the R99 power control algorithm.

One way to address the limitations posed by the R99, or offset type power control, is to set the HS-SCCH transmit power dynamically in response to the Channel Quality Information (CQI) reports transmitted periodically on the HS-DPCCH. An advantage of CQI-based power control is that power control applied to the HS-SCCH is decoupled from power control applied to the DPCCH, allowing for more efficient power control of the HS-SCCH in SHO without compromising the performance of the dedicated channels. In addition, since quantitative information related to the received power level at UE 140 is directly available in the CQI report sent from UE 140 to Node B BTS 132, CQI-based power control can stabilize power fluctuations in a single step. It should be noted that the performance of CQI-based power control, however, is highly dependent on factors including, for example, the fading characteristics of the channel, the CQI reporting period, and feedback delay. In HSDPA, the maximum CQI reporting is 500 Hz, which renders CQI-based power control ineffective at medium vehicular speeds (30 km/h).

Thus, conventional methods have drawbacks including but not limited to poor performance of R99 power control algorithms during SHO; inadequacy of CQI-based power control algorithms, which while having the capability of eliminating SHO degradation are limited by the relatively infrequent CQI updates (500 Hz at maximum), resulting in poor performance at medium vehicular speeds (e.g. 30 km/h); delay between channel measurement and actual power adjustment, resulting in mismatch between the measured channel condition and the actual channel condition at the time of power control application. Additionally, both R99 and conventional CQI methods perform worse with power control than without power control at high vehicular speeds (e.g. 120 km/h).

Therefore, CQI-based power control with an additional feature of linear prediction can be implemented in accordance with various exemplary embodiments to mitigate these limitations. Accordingly, as will be described in greater detail herein, two predictors can be configured to alleviate, for example, CQI reporting delay and provide faster power adjustments.

Advantages associated with power control in accordance with various exemplary embodiments include accounting for the delay in CQI reporting by providing faster power control than previously possible and within the prescribed reporting period; providing accurate power adjustment instead of adjustments in fixed step size; allowing for the application of power control with no operational changes when the system is in SHO. It is important to note that since the Node B may not know whether the UE is in SHO the ability to apply power control without impacting operational parameters is central to maintaining operational integrity during SHO. Further, the predictors, in accordance with various exemplary embodiments, can serve as smoothing filters at high vehicular speeds and thus improve performance by limiting large power changes.

Figure 2:
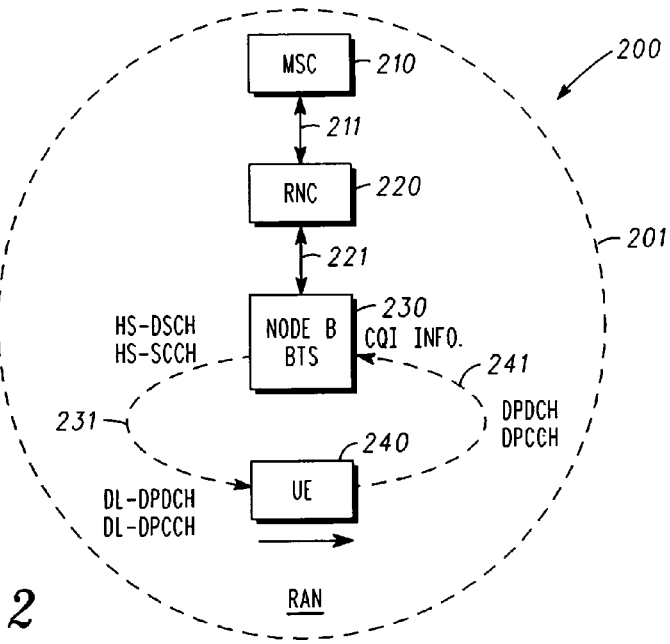
FIG. 2 is a diagram illustrating an exemplary HSDPA RAN serving a UE in accordance with various exemplary embodiments.

Thus, in accordance with various exemplary embodiments as depicted, for example in the diagram 200 of FIG. 2, an exemplary configuration of a RAN 201 includes a MSC 210, a Radio Network Controller (RNC) 220, and a Node B BTS 230 having for example HSDPA capabilities, that is shown serving a UE 240 which may or may not be in SHO. To address the limitations described above in connection with conventional power control, CQI-based power control with linear predictors can be used as will be described to mitigate these limitations.

In the RAN 201, rapid power control can be applied to the downlink HS SCCH by processing CQI reports such as CQI INFO as will be appreciated by those of ordinary skill issued from UE 240 over the uplink channel 241 in accordance with various principles discussed and described hereinafter. In particular, based on information, i.e., a quality value Q, directly or indirectly derived from a CQI report received at a time t, a received power, for example of the HS-DSCH can be calculated to arrive at a CQI normalized for power level control for any time in a first predictor. It should be noted that the CQI info or quality values is typically in the form of factors such as maximum transport block size, number of HS-DSCH codes, modulation capable of being received (e.g., symbol rates, spreading factors, symbol constellations, and similar parameters), and the like as opposed to received power. However received power may be derived from CQI INFO at a first interval after time t and, at a second interval after time t the received power can be predicted and interpolation used to generate adjustments for any time interval which falls in between CQI reports.

Figure 3:
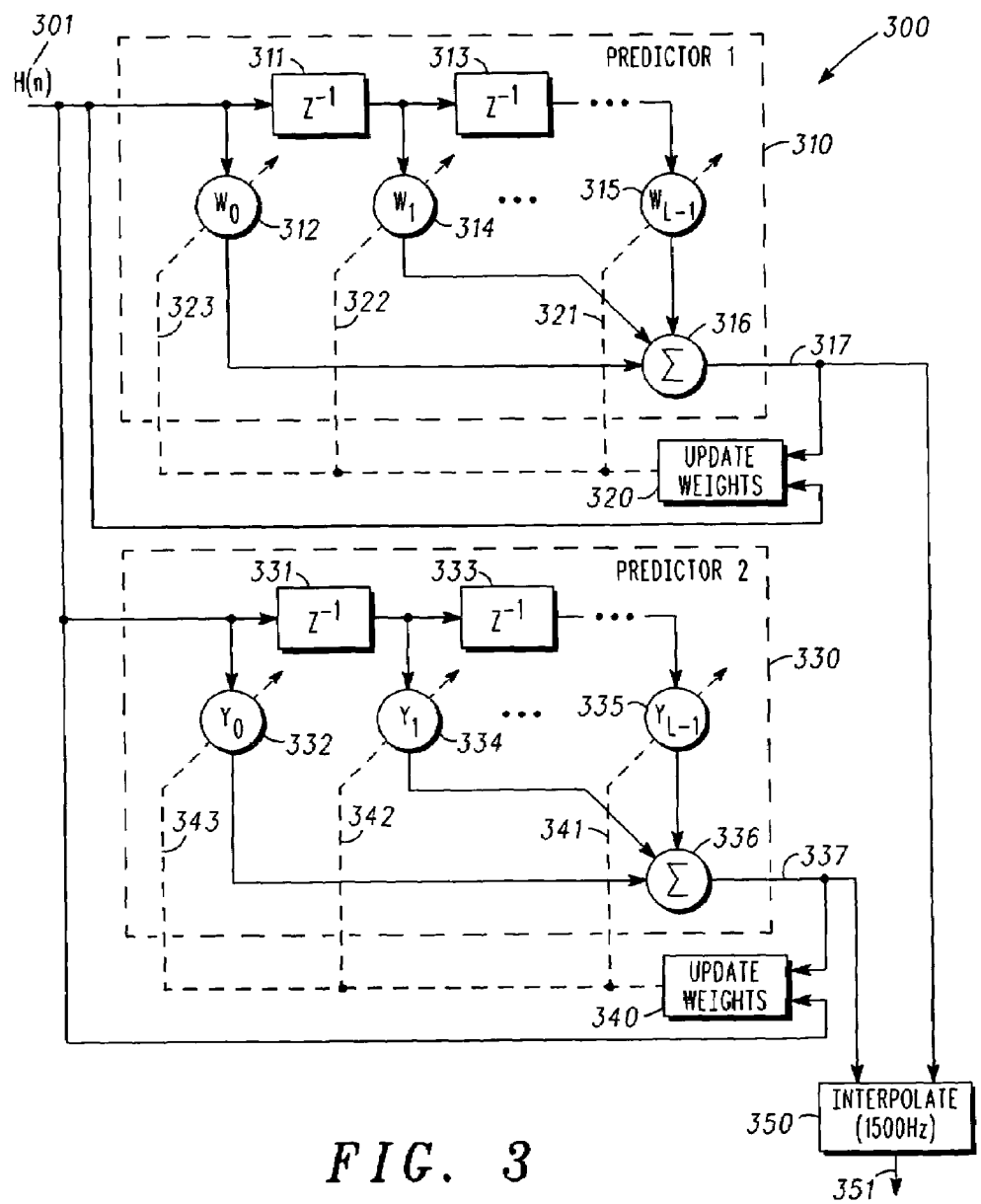
FIG. 3 is a diagram illustrating exemplary predictors and an interpolator for generating power control in accordance with various exemplary embodiments.

A more detailed illustration of the predictor circuits 300, as shown in FIG. 3, provides a better understanding of rapid power control in accordance with various exemplary embodiments. Various CQI related factors as described above, such as maximum transport block size may be initially processed to form a normalized CQI value, that is, a derived received power value, which can be input as H(n) 301 to predictor circuits 300. A first predictor 310 can thus provide the first prediction output value 317 for a time n, which as will be described in greater detail hereinafter, can include, for example, the received power value at interval (n+k). A second predictor 330 can provide a second prediction output value 337 which in combination with the first prediction output value 317 can be input to an interpolator 350. The interpolator 350 can be used to generate a transmit power adjustment value for any time interval up to a minimum interval represented by 1500 Hz adjustment frequency which is fully 3 times the frequency associated with conventional fastest CQI reporting period. As shown, H(n) 301 is the normalized CQI value that is, for example, a derived received power value, which can be input to the first predictor 310 to first transfer blocks 311 and 313 which can be used to apply a series of L adaptive filter functions, transfer functions or the like $Z^{-1}$ as will be appreciated by one of ordinary skill in the art. H(n) 301 and the outputs of first transfer blocks 311 and 313 can be coupled, under the influence of first variable weights $W_0$ 312 $W_1$ 314 and $W_{L-1}$ 315, to first summer 316 to generate the first prediction value 317 which may be used to update weights in update block 320 and can also be used as an input to interpolator 350 as described above. The output of update block 320 can provide weights, weight adjustments or the like, 321, 322, and 323 to first variable weights $W_{L-1}$ 315, $W_1$ 314, and $W_0$ 312 respectively.

H(n) can also be input to the second predictor 330 to second transfer blocks 331 and 333 which can be used to apply a series of L adaptive filter functions, transfer functions or the like $Z^{-1}$ as will be appreciated by one of ordinary skill in the art. H(n) 301 and the outputs of transfer blocks 331 and 333 can be coupled, under the influence of variable weights $Y_0$ 332 $Y_1$ 334 and $Y_{L-1}$ 335, to summer 336 to generate the second prediction value 337 which may be used to update weights in update block 340 and can also be used as an input to interpolator 350 as described above. The output of update block 340 can provide weights, weight adjustments or the like, 341, 342, and 343 to first variable weights $Y_{L-1}$ 335, $Y_1$ 334, and $Y_0$ 332 respectively. As noted above, the first prediction value 317 and the second prediction value 337 can be input to interpolator 350 to generate a transmit power value for any time interval beyond the second prediction interval and within the 500 Hz CQI reporting period of 2 ms such that a time interval representing 1500 Hz, e.g. 0.666667 ms, is not exceeded.

Figure 4:
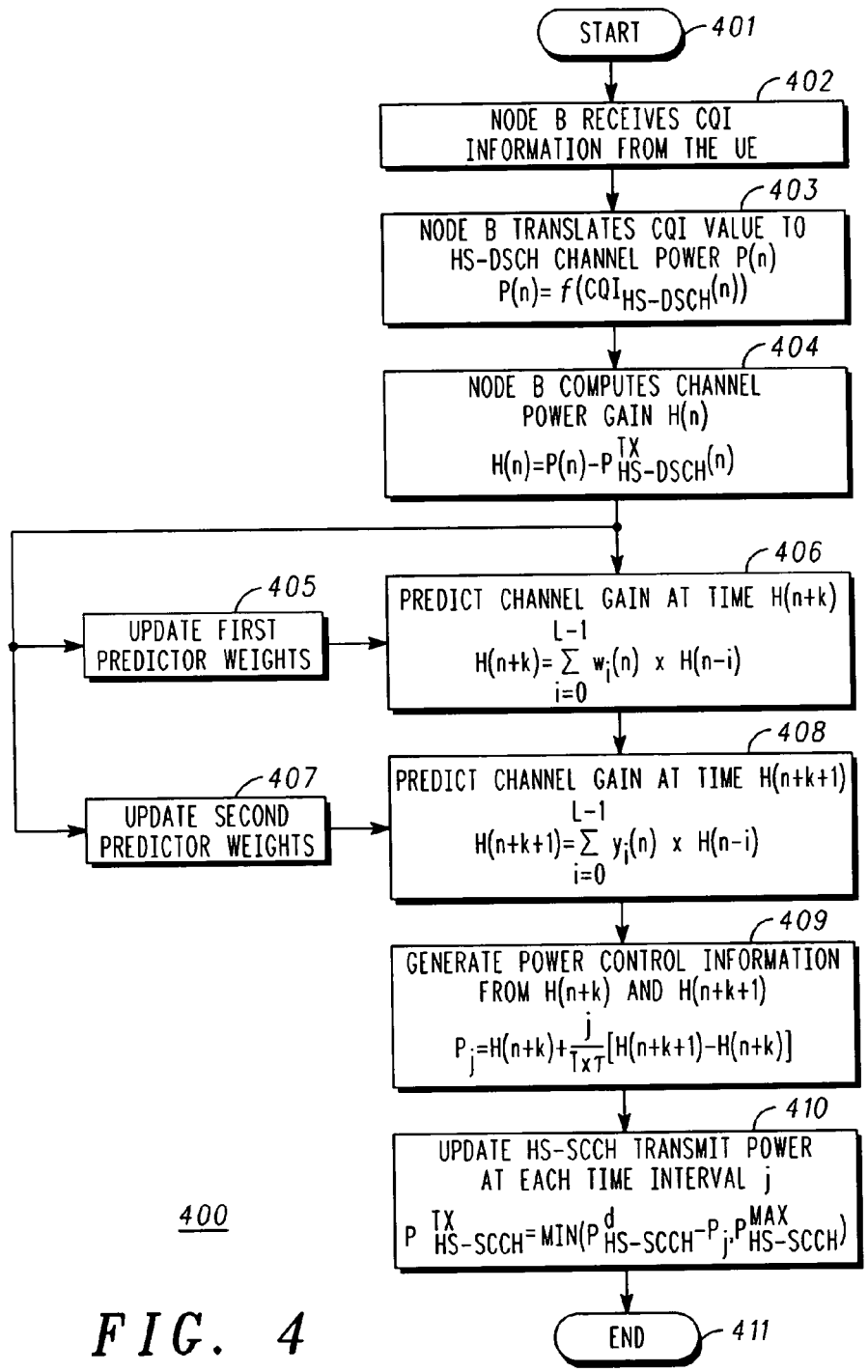
FIG. 4 is a flow chart illustrating an exemplary procedure in accordance with various exemplary embodiments.

A simplified and representative exemplary procedure for operation in accordance with various exemplary embodiments is shown in the flow chart 400 of FIG. 4. After starting at 401, the Node B BTS, such as the Node B BTS 230, receives a Channel Quality Information (CQI) report from the UE, such as the UE 240 on the HS-DPCCH at 402. It is important to note that instead of reporting the actual received power, the UE reports values such as the maximum transport block size, number of HS-DSCH codes and modulation that can be received. As a result, the Node B BTS translates the CQI values to the received power of the HS-DSCH at 403 in accordance with Equation (1) as follows:

$$P^{RX}_{HS-DSCH}(n) = f(CQI_{HS-DSCH}(n)) \quad (1)$$

The normalized CQI of the HS-SCCH or the channel power gain H(n) is then determined at 404 in accordance with Equation (2) as follows (or the more general equation shown at 404):

$$H(n) = P_{HS-DSCH}^{RX}(n) - P_{HS-DSCH}^{TX}(n)(\text{dB}) \qquad (2)$$

It will be appreciated by those of ordinary skill that in addition to generating a difference between the receiver and transmit power values shown in equation (2), a generalized reference power P(n) may be used at 404 to generate a normalized power value, for example, in accordance with Equation (1) or in accordance with a reference power P(n) derived from any component of the CQI report reasonably relating to a reference power level At 405, the first predictor weights can be initialized or if power control is already active can be updated and, at 406, the CQI, noted as H(n), at time n+k can be predicted according to Equation (3) as follows:

$$H(n+k) = \sum_{i=0}^{L-1} w_i(n) \times H(n-i) \qquad (3)$$

At 407, the second predictor weights can be initialized or, if power control is already active, can be updated and at 408, the CQI, again noted as H(n), can be predicted at time n+k+1 according to Equation (4) as follows:

$$H(n+k+1) = \sum_{i=0}^{L-1} y_i(n) \times H(n-i) \qquad (4)$$

Once prediction values for H(n) are found for two intervals, fast power adjustments are possible by interpolating between the two values at 409 in accordance with Equation (5) as follows:

$$P_j = H(n+k) + \frac{j}{T \times \tau}[H(n+k+1) - H(n+k)] \qquad (5)$$

for j=0, ..., (T×τ−1). It is important to note that T is the desired power control frequency, such as 1500 Hz, while τ is the CQI reporting frequency, such as 500 Hz. The transmit power of the downlink HS-SCCH at each update interval j is then set at 410 in accordance with Equation (6) as follows:

$$P_{HS-SCCH}^{TX} = \min(P_{HS-SCCH}^d - P_j, P_{HS-SCCH}^{\max}) \qquad (6)$$

where $P_{HS-SCCH}^d$ is the desired received power of the HS-SCCH and $P_{HS-SCCH}^{\max}$ is the maximum allowable power of the HS-SCCH. It should be noted that the desired received power is usually determined according to a performance criterion such as a power level sufficient to maintain FER of less than 1%.

As previously noted with regard to 405 and 407, the predictor weights for the first and second predictors may be updated. The predictors can be updated using a Recursive Least Squares (RLS) method in accordance with Equation group (7) as follows:

(a) $\hat{H}(n) = s^H(n-1)u(n)$ \hfill (7)

(b) $\varepsilon(n) = \hat{H}(n) - H(n)$ (c) $k(n) = \dfrac{\lambda^{-1} P(n-1)u(n)}{1 + \lambda^{-1} u^H(n) P(n-1) u(n)}$ (d) $P(n) = \lambda^{-1} P(n-1) - \lambda^{-1} k(n) u^H(n) P(n-1)$ (e) $s(n) = s(n-1) + k(n)\varepsilon^*(n)$ where the weights $w_i$ of the first predictor are given by Equation (8):

$$s(n) = w(n) = [w_0(n) w_1(n) \ldots w_{L-1}(n)]$$

$$u(n) = [H(n-k) \ldots H(n-k-L+1)] \qquad (8)$$

and the weights $y_i$ of the second predictor are given by Equation (9):

$$s(n) = y(n) = [y_0(n) y_1(n) \ldots y_{L-1}(n)]$$

$$u(n) = [H(n-k-1) \ldots H(n-k-L)] \qquad (9)$$

It should be noted that since predictor weights are continuously updated, changes in the underlying propagation statistics arising, for example, from changes in vehicle speed, or the like, are automatically accounted for by operation of the adaptive predictor. While predictor weights are being trained however, their application may at least initially lead to unacceptable prediction errors. To prevent or limit the adverse impact of prediction errors during training, initialization, or the like, predictors may be disabled during training, initialization, or the like and only current CQI information can be used during such periods for setting temporary values of the HS-SCCH power until the predictors have been trained, have converged, or the like. One simple criteria for determining convergence is to examine the average squared errors over several updating periods in accordance with Equation (10) as follows:

$$\frac{1}{K}\sum_{i=0}^{K-1} |\varepsilon^2(n-i)| \leq \kappa \qquad (10)$$

where ε(n) is the prediction error shown in Eq. 7(b) and κ is a constant used to determine convergence. While in FIG. 4, the completion of the exemplary procedure is indicated at END 411, it will be appreciated that in accordance with various exemplary embodiments, the procedure can loop a predetermined number of times or loop infinitely during power control operations, or the like without departing from the scope of the invention.

Figure 5:
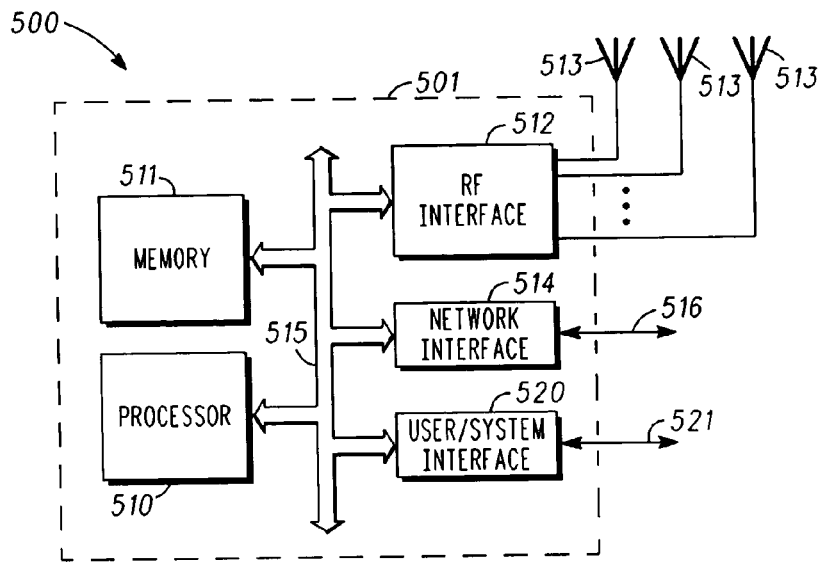
FIG. 5 is a block diagram illustrating components of an exemplary apparatus in accordance with various exemplary and alternative exemplary embodiments.

It will be appreciated that in accordance with various exemplary embodiments, the present invention can be implemented in a Radio Access Network as part of an infrastructure component, sub component, or the like. In FIG. 5, a block diagram is shown of an exemplary apparatus for use in implementation of the present invention. The device 501 of FIG. 5, for example, can be an infrastructure component or device such as a transmitter unit (of a Node B or BTS) or the like, and can include a processor 510 and a memory 511 coupled using a bus 515. It will be appreciated by those of ordinary skill in the art that the processor 510 may be a general purpose processor or a dedicated processor such as a signal processor and may be implemented as a dedicated ASIC or the like at noted herein above.

The memory 511 can be or include a memory device such as a Random Access Memory (RAM) which matches the transfer speed and access speed requirements associated with the processor 510 and the bus 515. In addition, the device 501 includes a radio frequency (RF) interface 512, e.g., RF transceiver including transmitter and receiver, which may be coupled to one antenna 513 or many antennas 513 such as where transmit diversity is used. Device 510 may also include a network interface 514 with a link 516 to accommodate access to a local or wide area IP network or the like and may further include a user/system interface 520 with link 521 for connecting to other control components or the like within the RAN. It will be appreciated that in accordance with various exemplary embodiments such as the exemplary procedure described in connection with FIG. 4, various inventive processes can be implemented as one or more software programs, routines or the like which can process input derived from communication channels received from RF interface 512, and apply the transmit power control procedures described herein to effect changes to the transmit power of outbound channels transmitted from RF interface 512.

Figure 6:
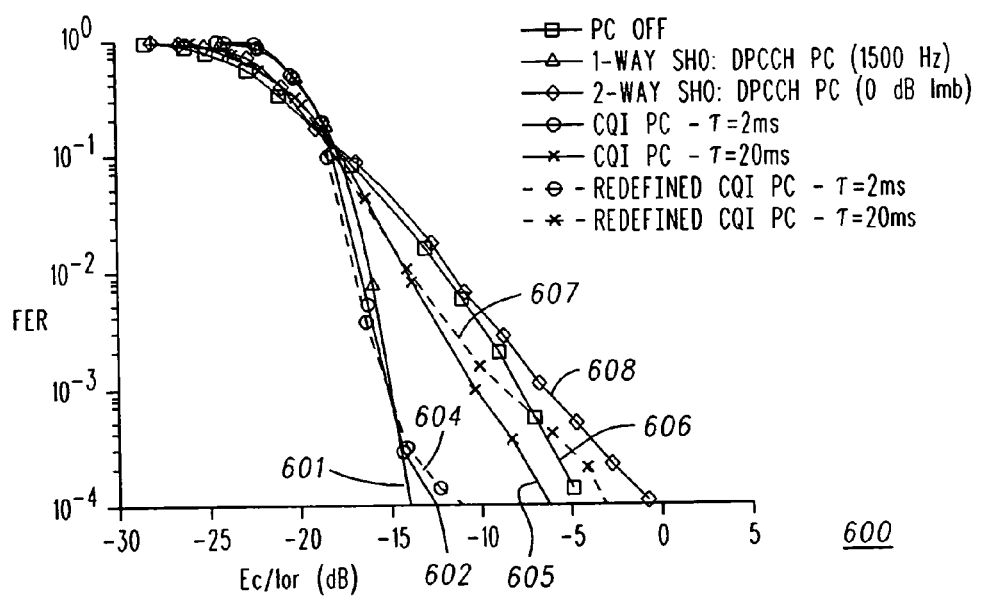
FIG. 6 is a graph illustrating the performance of exemplary power control in accordance with various exemplary and alternative exemplary embodiments at UE speeds of around 3 km/h.
Figure 7:
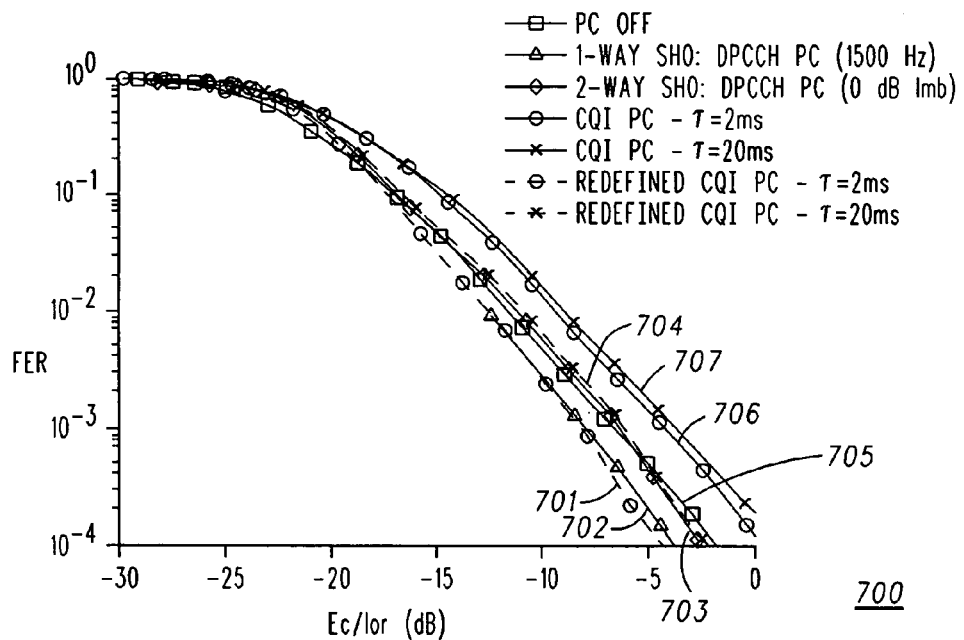
FIG. 7 is a graph illustrating the performance of exemplary power control in accordance with various exemplary and alternative exemplary embodiments at UE speeds of around 30 km/h.
Figure 8:
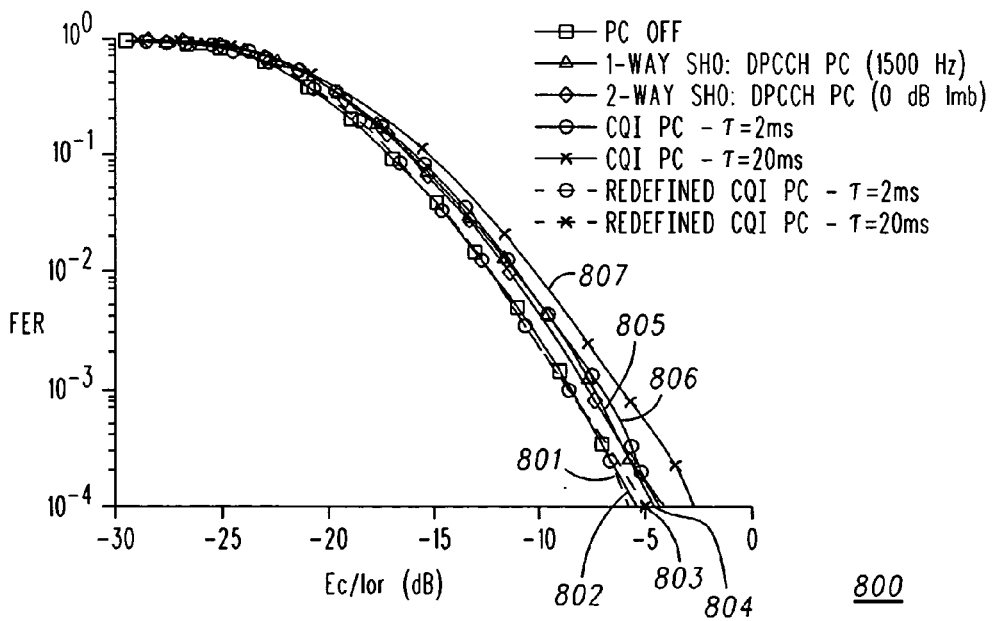
FIG. 8 is a graph of performance of exemplary power control in accordance with various exemplary and alternative exemplary embodiments at UE speeds of around 120 km/h.

As previously noted, FIG. 6, FIG. 7, and FIG. 8 show comparative performance gains associated with power control in accordance with the present invention and various performance degradations for a UE traveling at various velocities. In FIG. 6, a graph 600 illustrates comparative Frame Error Rate (FER) performance of the HS-SCCH for UE velocities of 3 km/h with a flat Rayleigh fading channel, trace 601 shows 1 way SHO power control performance with a 1500 Hz update rate such as with R99 power control, trace 602 shows power control performance using CQI information and 2 ms update period. Trace 604 shows power control performance using a redefined CQI and a 2 ms period in accordance with various exemplary embodiments. Trace 605 shows power control performance using CQI information and 20 ms update period. Trace 606 shows performance with no power control. Trace 607 shows power control performance using a redefined CQI and a 20 ms update period in accordance with various exemplary embodiments. Trace 608 shows 2 way SHO power control performance.

FIG. 7 shows a graph 700 that illustrates comparative Frame Error Rate (FER) performance for the HS-SCCH for UE velocities of 30 km/h with a flat Rayleigh fading channel. Trace 701 shows power control performance using a redefined CQI and a 2 ms period in accordance with various exemplary embodiments. Trace 702 shows 1 way SHO power control performance with a 1500 Hz update rate such as with R99 power control. Trace 703 shows 2 way SHO power control performance. Trace 704 shows power control performance using a redefined CQI and a 20 ms update period in accordance with various exemplary embodiments. Trace 705 shows performance with no power control. Trace 706 shows power control performance using CQI information and 2 ms update period. Trace 707 shows power control performance using CQI information and 20 ms update period.

FIG. 8 is a graph 800 that illustrates comparative Frame Error Rate (FER) performance for the HS-SCCH for UE velocities of 120 km/h with a flat Rayleigh fading channel. Trace 801 shows power control performance using a redefined CQI and a 2 ms period in accordance with various exemplary embodiments. Trace 802 shows performance with no power control. Trace 803 shows power control performance using a redefined CQI and a 20 ms update period in accordance with various exemplary embodiments. Trace 804 shows 2 way SHO power control performance. Trace 805 shows 1 way SHO power control performance with a 1500 Hz update rate such as with R99 power control. Trace 806 shows power control performance using CQI information and 2 ms update period. Trace 807 shows power control performance using CQI information and 20 ms update period.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. Many such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for performing rapid power control in an infrastructure component associated with a Radio Access Network (RAN), the method comprising:

translating a quality value $Q$ received on an uplink channel from a User Equipment (UE) into a transmit power value associated with a downlink channel, the quality value $Q$ corresponding to a channel as received by the UE, the quality value $Q$ received according to a time period;

generating a first predicted value for the quality value $Q$ at a first time increment during the time period, and generating a second predicted value for the quality value $Q$ at a second time increment during the time period, the second time increment different from the first time increment and wherein the second predicted value includes a value H(n) according to the relation:

$$H(n+k+1) = \sum_{i=0}^{L-1} y_i(n) \times H(n-i),$$

wherein k includes the first time increment, L is a number of filters, and where $y_i$ includes a weight for interval i.

2. A method according to claim 1, further comprising generating an adjusted transmit power value based on the first predicted value.

3. A method according to claim 1, further comprising generating an adjusted transmit power value based on the first predicted value and the second predicted value.

4. A method according to claim 3, wherein the generating the adjusted transmit value includes interpolating between the first predicted value and the second predicted value.

5. A method according to claim 1, wherein the quality value $Q$ includes a Channel Quality Indicator (CQI).

6. A method according to claim 1, wherein the infrastructure component include a Node B transceiver.

7. A method according to claim 1, wherein the time period corresponds to a first frequency of receiving the quality value Q and the first predicted value for the quality value Q is generated at a prediction frequency at least equal to the first frequency, wherein each quality value Q and first predicted value are, respectively, translated into the transmit power value at a frequency exceeding the first frequency.

8. A method according to claim 1, wherein the first predicted value includes a value H(n) and wherein the generating the first predicted value includes generating the first predicted value according to the relation:

$$H(n+k) = \sum_{i=0}^{L-1} w_i(n) \times H(n-i),$$

wherein k includes the first time increment, L is a number of filters, and $w_i$ includes a weight for interval i.

9. An apparatus in an infrastructure component comprising:
  an RF interface;
  a memory;
  a processor coupled to the memory and the RF interface, the processor configured to:
  translate a first value received from an uplink channel associated with the RF interface into a second value for a downlink channel associated with the RF interface, the first value received according to a time period;
  predict, based on at least the first value, a first predicted value for the second value at a first time within the time period using a recursive least squares procedure, wherein the first predicted value is utilized in updating a first set of weights using the recursive least square procedure, and
  predict a second predicted value for the second value at a second time within the time period using the recursive least squares procedure, the second time different from the first time and wherein the second predicted value is utilized in updating a second set of weights using the recursive least squares procedure.

10. An apparatus in accordance with claim 9, wherein the uplink channel includes a High Speed Dedicated Physical Control Channel (HS-DPCCH) channel and the first value includes a Channel Quality Indicator (CQI).

11. An apparatus in accordance with claim 9, wherein the downlink channel includes a High Speed Shared Control Channel (HS-SCCH) channel and the second value includes a transmit power level.

12. An apparatus in accordance with claim 9, wherein the infrastructure component includes a Node B transceiver.

13. An apparatus according to claim 9, wherein the time period corresponds to a frequency of reporting a Channel Quality Indicator (CQI) and the first predicted value and the second predicted value are used to increase a rate of performing transmit power control on a HS-SCCH channel.

14. A method for performing rapid power control in an infrastructure component associated with a Radio Access Network (RAN), the method comprising:
  translating a quality value Q received on an uplink channel from a User Equipment (UE) into a transmit power value associated with a downlink channel, the quality value Q corresponding to a channel as received by the UE, the quality value Q received according to a time period, and
  generating a first predicted value for the quality value Q at a first time increment during the time period, and
  wherein the time period corresponds to a first frequency of receiving the quality value Q and the first predicted value for the quality value Q is generated at a prediction frequency at least equal to the first frequency, wherein each quality value Q and first predicted value are, respectively, translated into the transmit power value at a frequency exceeding the first frequency.

15. A method for performing rapid power control in an infrastructure component associated with a Radio Access Network (RAN), the method comprising:
  translating a quality value Q received on an uplink channel from a User Equipment (UE) into a transmit power value associated with a downlink channel, the quality value Q corresponding to a channel as received by the UE, the quality value Q received according to a time period, and
  generating a first predicted value for the quality value Q at a first time increment during the time period and
  wherein the first predicted value includes a value H(n) and wherein the generating the first predicted value includes generating the first predicted value according to the relation:

$$H(n+k) = \sum_{i=0}^{L-1} w_i(n) \times H(n-i),$$

wherein k includes the first time increment, L is a number of filters, and $w_i$ includes a weight for interval i.

* * * * *